(No Model.)
W. S. HOGG.
SHIP'S LOG.
No. 253,287. Patented Feb. 7, 1882.
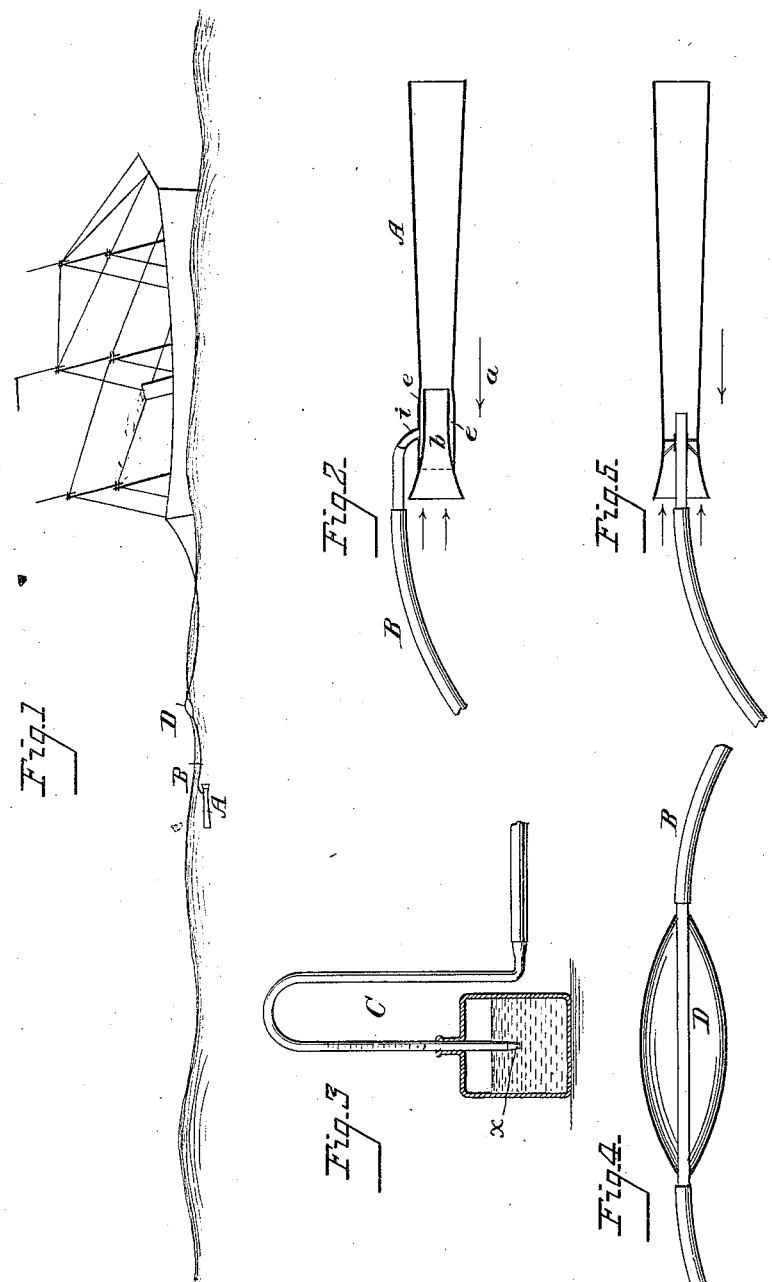
Attest:
Courtney A. Cooper
William Paxton
Inventor:
W. S. Hogg
By his Attorney
Charles E. Foster

UNITED STATES PATENT OFFICE.

WILLIAM S. HOGG, OF WASHINGTON, DISTRICT OF COLUMBIA.

SHIP'S LOG.

SPECIFICATION forming part of Letters Patent No. 253,287, dated February 7, 1882.

Application filed September 14, 1881. (No model.)

*To all whom it may concern:*

Be it known that I, WILLIAM S. HOGG, a citizen of the United States, and a resident of Washington, District of Columbia, have invented certain Improvements in Ships' Logs, of which the following is a specification.

My invention has for its object to readily and accurately determine the speed of a vessel moving through the water, regardless of the time, position of the vessel, or condition of the water; and this I effect by means of a device for creating a vacuum in a pipe extending to such a distance from the vessel as to be outside of the body of water affected by the vessel's movements, yet communicating with an indicating device upon the vessel, so graduated as to show the extent of the vacuum, and consequently the speed at which the vessel is moving through the water.

In the drawings, Figure 1 is a view illustrating my improved speed-measuring instrument and the method of using the same. Fig. 2 is a sectional view showing one form of instrument. Fig. 3 is a section showing an indicator. Fig. 4 is a section showing a float to be used with the instrument, and Fig. 5 is a modification of part of the instrument.

The instrument consists essentially of a flexible pipe, an indicator or gage upon the ship, with which one end of the pipe is connected, and a vacuum device of any suitable construction, connected to the opposite end of the pipe, towed after the ship, and constructed to permit the water to so flow past the end of the pipe as to create a partial vacuum in the latter. Obviously devices may be variously constructed to secure this result. In Figs. 2 and 5 I show two forms.

In Fig. 2, A is a tube open at both ends, the forward end being flaring, the better to catch the water as the tube is drawn through the same in the direction of the arrow *a*. This tube is provided at the front end with a sleeve, *b*, which meets the tube at the front end, and is contracted (or the tube is enlarged) to form a surrounding chamber, *e*, open at the rear end and communicating with a port, *i*, leading to the outer end of a long flexible and non-extensible pipe, B, which at the opposite end communicates with a vacuum or other gage, C, of any suitable form, arranged in any desirable position upon the vessel. The tube A is so constructed and connected to the pipe B that the said tube will be maintained in a substantially horizontal position, and vanes, floats, or other appliances may be attached to the same for this purpose. One means which I have found efficacious is a hollow float, D, of about the same specific gravity as the water, placed in the line of the pipe, and serving, while maintaining its position at about the surface of the water, to absorb and break any vibrations imparted to the pipe by the pitching or swaying of the vessel, so that the same shall not be conveyed to or disturb the tube A. As the tube is towed after the vessel and carried through the water the air (or water) is withdrawn from the pipe B to an extent proportioned to the speed of the vessel, thereby creating a partial vacuum in the pipe and in the gage C, which indicates, by the position of the mercury or index-finger of the gage, the speed of the vessel, this indication being afforded as well at night as during the day, as long as the implement is in position.

Vacuum-indicators have heretofore been proposed, but in all cases as appliances connected rigidly and in close proximity to the vessel; but such means are totally inoperative, not only owing to the pitching and swaying of the vessel, carrying the instruments to different depths and sometimes out of the water, but also to the fact that the vessel always carries with and near it a considerable body of water, the movement of which in the same direction as the vessel interferes with accurate measurements, depending upon the extent of the movement of the vessel through the water.

By the use of a long flexible pipe I am enabled to place the vacuum device at such a distance from the vessel as to be outside of the body of water affected by the vessel, as well as beyond the point where it can be materially agitated and disturbed by the pitching or sudden movements or veering of the vessel, and I have found by repeated tests that by this means I can, under all conditions, (where the water is unobstructed by floating material,) determine the speed with the utmost accuracy.

In Fig. 5 the positions of the parts are reversed, the end of the pipe B being in the axis of the tube A, and the water flowing round and outside of the tube with like effect.

It is desirable, especially in rough weather, to prevent the vibration of the gage, resulting from constant jerking upon the connecting-pipe B. I therefore (when a mercury-gage is used) contract some portion of the passage, as at $x$, Fig. 3, so as to throttle it slightly and prevent the pulsations of the air in the tube being instantly transmitted to the mercury-column. Where a spring or other balance is used the throttling effect may be secured by a revolving fan, governor, gears, or other like device.

It is obvious that the vacuum device may be placed outside the sphere of the vessel's action by connecting the pipe to the end of a spar rigged out to one side of the vessel.

Without confining myself to the precise devices shown, I claim—

1. In a ship's log, a vacuum apparatus constructed to permit a current of water to pass through the same as it is towed through the water, a gage upon a vessel, and a flexible tube connecting the gage and vacuum apparatus, and of a length to permit the latter to occupy a position in the water beyond the area affected by the vessel's motion, all as set forth.

2. The combination, with the appliances described and claimed, of a gage and throttling device, substantially as described.

3. The combination of the vacuum device, gage, connecting flexible pipe, and a float, substantially as and for the purpose set forth.

In testimony whereof I have signed my name to this specification in the presence of two subscribing witnesses.

W. S. HOGG.

Witnesses:
CHARLES E. FOSTER,
WILLIAM PAXTON.